Jan. 4, 1927.
J. F. SEARING
1,613,248
BEVERAGE DISPENSING APPARATUS
Filed July 27, 1925
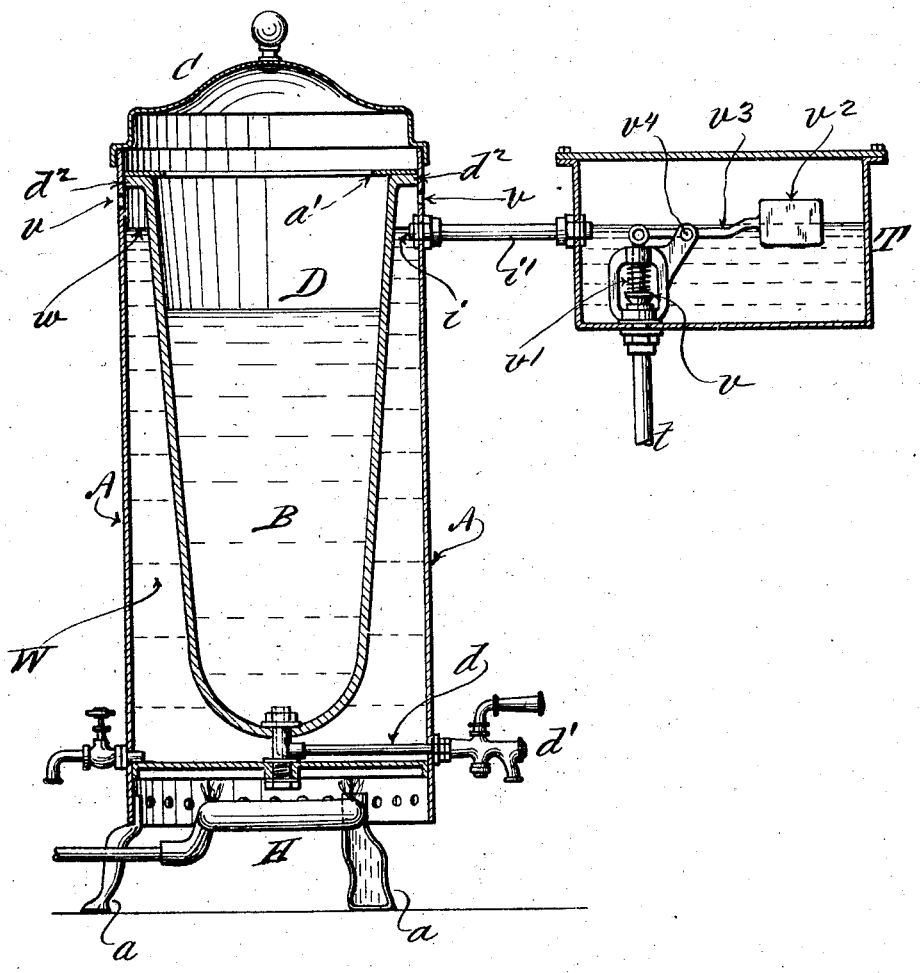
INVENTOR:
John F. Searing,
BY Geo. Wm Miott
ATTORNEY Patented Jan. 4, 1927.

1,613,248

UNITED STATES PATENT OFFICE.

JOHN F. SEARING, OF NEW ROCHELLE, NEW YORK.

BEVERAGE-DISPENSING APPARATUS.

Application filed July 27, 1925. Serial No. 46,253.

My improvements relate to apparatus for dispensing warm or hot beverages, as coffee, tea, etc., in which the beverage compartment is positioned in a water container provided with heating means in a manner well known in the art, the object of my invention being to automatically maintain a prescribed level in said hot water container, so as to insure a substantially even temperature in the beverage compartment, and obviate all possibility of damage or danger that might otherwise result from the depletion or exhaustion of the liquid heat vehicle, all as hereinafter set forth,—the invention consisting in the specific combination and arrangement of parts and appurtenances described and claimed.

In the accompanying drawing I illustrate a practical embodiment of the essential features of my invention as applied and adapted to beverage heating and dispensing means, although I do not limit myself to the identical form, construction and arrangement of component parts and appurtenances herein shown by way of exemplification, since changes may be made in minor details, and equivalent mechanical expedients resorted to, with like results, and without departing from the spirit and intent of my invention in this respect.

With this understanding, A, represents a cylindrical water container and heater of a well known type supported on legs $a$, $a$, to afford space for positioning thereunder suitable heating means H, as for instance the gas burner indicated in the drawing, or any substitute therefor, adapted to raise the temperature of the water W, in the container A, sufficiently to enable it to function as a liquid vehicle for the transmission of heat to the beverage B, in the dispensing compartment D,—the latter being provided and connected at its lower extremity with the usual discharge pipe $d$, and dispensing faucet $d'$, in a manner well known in the art.

The upper edge or rim $d^2$, of the beverage compartment D, fits and rests snugly against the inner surface of the water-containing cylinder A, so as to exclude steam or water vapor generated in the latter from entrance into said beverage compartment D, relief vents $u$, being formed in the upper part of said water container A, above the prescribed water level $w$, therein, to obviate internal pressure.

$a'$, represents the usual annular flange plates resting on the top of the beverage compartment D, for the support of the open edge or mouth of a bag (not shown) containing coffee or other beverage ingredient for solution, also in a manner well known in the art; and C, is the usual cover for both heater A, and dispenser D.

Situated at, and prescribing the water level $w$, in the water container, A, is a feed water inlet duct $i$, connected by a pipe $i^1$, with a feed water tank T, which is connected by means of a supply pipe $t$, with a water main or other source of water under pressure sufficient to insure delivery to said tank, T, the intake thereto being regulated automatically through the medium of a float—controlled valve $v$, positioned over the upper end of said supply pipe $t$. A spring $v^1$, on the stem of the valve $v$, tends constantly to hold the valve to its seat until overcome by the weight of the float $v^2$, the lever $v^3$, of which is fulcrumed at $v^4$ and is pivotally connected with said stem of the valve $v$.

Hence, obviously, when the water level $w$, in the heating compartment A, falls below normal for any reason, as by evaporation or otherwise, thereby lowering the level of supply water in the tank T, the float $v^2$, will be correspondingly lowered, and sufficiently so to raise the valve $v$, from its seat, and thereby admit water from the supply pipe $t$, to replenish the deficiency and restore normal water level in both the water heating compartment A, and its supply tank T; and this operation will repeat automatically upon occasion as long as heat is applied to the bottom of the container A.

As a result of my invention all danger of overheating by reason of partial or total exhaustion of the liquid heating vehicle W, in the container A, is obviated which might otherwise happen as heretofore by reason of lack of attention which lack has in the past frequently been detrimental or disastrous to both apparatus and contents, and even to extraneous areas. In fact, and in other words, my combination with the heating vessel of automatic water feeds renders the apparatus practically fool proof and safe by effecting and maintaining a prescribed water level under all circumstances and conditions of use, so that even if the heating means be not turned off, for instance, at night, no damage can come from such or analogous carelessness.

Furthermore, by thus automatically maintaining the prescribed level of liquid heat vehicle in the heater A, a safe normal temperature is imparted to the beverage B, in the dispensing compartment D.

What I claim as my invention and desire to secure by Letters Patent is:

1. In beverage dispensing apparatus of the character designated, a feed water tank the combination of a beverage compartment, means for dispensing liquid therefrom, a hot water container in which said beverage compartment is positioned, said water container having an inlet duct at a prescribed level adjacent the upper end of the beverage compartment, means for heating the water in said container, a conduit connecting said inlet duct with said feed water tank, an inlet pipe connecting said tank with a source of water supply under pressure, and a float-actuated and controlled valve in said tank arranged to govern the admission of water thereto through the medium of the liquid level in the said hot water container, said hot water container having a relief vent in the wall thereof above the normal water level of the container substantially in the manner and for the purpose set forth.

2. In a beverage dispensing device, a water container, a beverage compartment therein having a lateral flange at its upper end and forming an air tight joint with the wall of the container, an annular flange plate resting on said flange, means for ingress of water under pressure into the upper end of the water continer, a beverage withdrawal pipe at the bottom of the container, said container having relief vents below and adjacent said flange and a support for the beverage container and with which the dispensing pipe is connected and supported.

JOHN F. SEARING.